(12) United States Patent
Van Wageningen et al.

(10) Patent No.: US 12,081,265 B2
(45) Date of Patent: Sep. 3, 2024

(54) OPTICAL WIRELESS COMMUNICATION SYSTEM AND DEVICE

(71) Applicant: SIGNIFY HOLDING B.V., Eindhoven (NL)

(72) Inventors: Andries Van Wageningen, Wijlre (NL); Michel Germe, Cormelles le Royal (NL); Johan-Paul Marie Gerard Linnartz, Eindhoven (NL); Paul Henricus Johannes Maria Voorthuisen, Sint Oedenrode (NL); Matthias Wendt, Wurselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/766,694

(22) PCT Filed: Oct. 5, 2020

(86) PCT No.: PCT/EP2020/077833
§ 371 (c)(1),
(2) Date: Apr. 5, 2022

(87) PCT Pub. No.: WO2021/069368
PCT Pub. Date: Apr. 15, 2021

(65) Prior Publication Data
US 2024/0072893 A1    Feb. 29, 2024

(30) Foreign Application Priority Data

Oct. 9, 2019   (EP) .................................... 19202127

(51) Int. Cl.
*H04B 10/114* (2013.01)

(52) U.S. Cl.
CPC .................................. *H04B 10/114* (2013.01)

(58) Field of Classification Search
CPC .............. H04B 10/114; H04B 10/1143; H04B 10/1149; H04B 10/116
See application file for complete search history.

(56) References Cited

U.S. PATENT DOCUMENTS 6,008,923 A * 12/1999 Samdahl ................ H04B 10/40
398/127
8,433,207 B2    4/2013 Shin et al.
(Continued)

FOREIGN PATENT DOCUMENTS

| CN | 101467368 A | 6/2009 |
| CN | 104349356 A | 2/2015 |

(Continued)

OTHER PUBLICATIONS

Z. Wu, et al., "Network Solutions for the Line-of-Sight Problem of New Multi-User Indoor Free-Space Optical System", ET Communications, the Institution of Engineering and Technology, GB, vol. 6, No. 5, Mar. 27, 2012, pp. 525-531.

*Primary Examiner* — Nathan M Cors

(57) ABSTRACT

According to one aspect disclosed herein, there is provided a client device for use in an optical wireless communications network, the client device comprising a transceiver configured to receive data via an optical wireless connection. The transceiver comprises an upward facing optical transducer configured to detect or transmit an optical wireless transmission, the sensor arranged to have a coverage area with at least two 5 concentric segments. A portion of the sensor is configured to provide an outermost segment of the at least two concentric segments.

16 Claims, 7 Drawing Sheets

(56) References Cited

U.S. PATENT DOCUMENTS

| | | | |
|---|---|---|---|
| 2002/0020803 A1* | 2/2002 | Suzuki | G02B 6/4292 |
| | | | 250/214 A |
| 2003/0035182 A1 | 2/2003 | Sidorovich et al. | |
| 2006/0019679 A1 | 1/2006 | Rappaport et al. | |
| 2006/0129342 A1 | 6/2006 | Placko et al. | |
| 2006/0268793 A1 | 11/2006 | Zanaty | |
| 2008/0138077 A1 | 6/2008 | Stretton | |
| 2011/0185202 A1 | 7/2011 | Black et al. | |
| 2015/0147067 A1 | 5/2015 | Daniel | |
| 2016/0281963 A1* | 9/2016 | Dussaume | H04B 10/116 |
| 2017/0187454 A1* | 6/2017 | Zhang | H05B 47/195 |

FOREIGN PATENT DOCUMENTS

| | | |
|---|---|---|
| CN | 106850062 A | 6/2017 |
| CN | 107994946 A | 5/2018 |
| CN | 109587443 A | 4/2019 |
| EP | 2869056 A1 | 5/2015 |
| JP | H11298412 A | 10/1999 |
| WO | 2002056507 A2 | 7/2002 |
| WO | 2018042370 A2 | 3/2018 |
| WO | 2018220388 A1 | 12/2018 |
| WO | 2019025758 A1 | 2/2019 |

\* cited by examiner

A  B  A+B

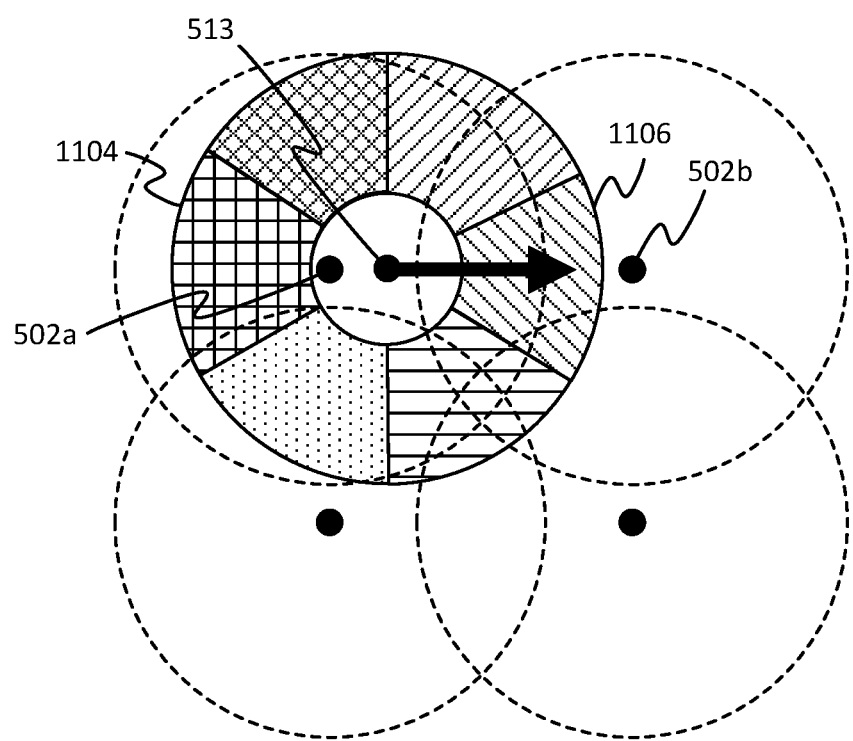

OPTICAL WIRELESS COMMUNICATION SYSTEM AND DEVICE

CROSS-REFERENCE TO PRIOR APPLICATIONS

This application is the U.S. National Phase application under 35 U.S.C. § 371 of International Application No. PCT/EP2020/077833, filed on Oct. 5, 2020, which claims the benefit of European Patent Application No. 19202127.7, filed on Oct. 9, 2019. These applications are hereby incorporated by reference herein.

TECHNICAL FIELD

The present disclosure relates to transducers for optical wireless communication.

BACKGROUND

Light Fidelity (Li-Fi) refers to techniques whereby information is communicated in the form of a signal embedded in visible light, infrared light or ultraviolet light emitted by a light source. Such techniques are sometimes also referred to as coded light, visible light communication (VLC) or free-space optical communication (FSO). The signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilising these regions of the spectra is the same, although variations may occur as a result of wavelength dependencies, such as in the case of refractive indices. In many instances there are advantages to using ultraviolet and/or infrared as these frequency ranges are not visible to the human eye. However, ultraviolet frequencies can have high energy levels and thus may be considered health hazards in certain circumstances.

Based on the modulations, the information in the Li-Fi coded light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

For instance, a sequence of data symbols may be modulated into the light emitted by a light source, such as light emitting diodes (LEDs) and laser diodes (LDs), faster than the persistence of the human eye. Contrary to radio frequency (RF) communication, Li-Fi generally uses a line-of-sight connection between the transmitter and the receiver for best performance.

Li-Fi is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

Wireless optical networks, such as Li-Fi networks, enable electronic devices like laptops, tablets, and smartphones to connect wirelessly to the internet. Wi-Fi achieves this using radio frequencies, but Li-Fi achieves this using the light spectrum which can enable unprecedented data transfer speed and bandwidth. Wi-Fi systems are becoming more limited in bandwidth due to interference resulting from neighbouring systems and their omnidirectional radiation pattern. Wi-Fi signals can pass through walls, ceilings, doors etc. but their bandwidth reduces with the density and number of units that are used. Li-Fi is becoming more and more popular as LED lighting systems are used in place of conventional lighting systems. Contrary to Wi-Fi, Li-Fi is directional and shielded by light blocking materials, which provides it with the potential to support higher bandwidth communication in a dense area of users as compared to Wi-Fi.

Furthermore, Li-Fi can be used in areas susceptible to electromagnetic interference. Consider that wireless data is now often required for more than just traditional connected devices—today televisions, speakers, headphones, printers, virtual reality (VR) goggles and even refrigerators use wireless data to connect and perform essential communications.

Digital wireless communications networks (optical or radio frequency based) are typically formed from a number of access points (typically comprising transceivers, but at least comprising transmitters for transmitting optical wireless data transmissions), and client devices (also typically comprising transceivers, but at least comprising receivers for receiving optical wireless data transmissions). The access points each sit in the centre of a coverage area (also referred to as a cell). This arrangement may also be referred to in an overall manner as an access point, e.g. the access point transceiver hardware and the coverage area combined. The coverage area or cell is the area within which the transmissions from the access point transceiver may be picked up by a client transceiver device. When positioned next to each other the cells typically fit together to cover larger areas. Each access point or node may be connected to a respective modem. The modem processes outgoing data signals into waveforms or modulated light suitable for transmission via wireless or optical channels respectively. Correspondingly, the modem may process incoming wirelessly received modulated light or waveforms into data.

Embodiments of the present invention are described in the context of a Li-Fi system consisting of a Li-Fi infrastructure with multiple Li-Fi access points, as shown in FIG. 1. Each access point comprises a modem connected to one or more transceivers (LiFi-TRX). LiFi client devices can connect to the one or more LiFi access points via an optical link, whereby the LiFi client device contains a modem connected to one or more client device transceivers (LiFi-TRX)

The function of a LiFi modem is to handle the PHY and MAC protocols for transmitting and receiving data. The LiFi transceivers (TRX) functioning such that:

LiFi-transmitter (Tx): transforms an electrical signal of the modem's transmit data to an optical signal (e.g. to be emitted by an LED), and LiFi-receiver (Rx): transforms an optical signal to an electrical signal of the modem's receive data (e.g. a photodiode).

FIG. 1 shows an environment 100, comprising a ceiling 102 with a LiFi-infrastructure made up of a plurality of transceivers 104, and a floor with a desk, on the desk there is an example of a LiFi client device 106 (a laptop). In FIG. 1 the LiFi device 106 comprises a laptop computer with a dedicated dongle for receiving optical signals.

For the Li-Fi system of FIG. 1 it can be seen that the access point transceivers are positioned on the ceiling in order to provide the required coverage of the area below.

FIG. 2 shows the same environment 100 comprising a Li-Fi infrastructure with multiple Li-Fi transceivers 104. The transceivers 104 are located in a first planar area (first plane), e.g. the ceiling, and have an optical coverage area for transmitting and receiving Li-Fi signals projected onto a second planar area (second plane), e.g. the floor or a desk height level. Two projections 202a and 202b are shown originating from two respective access point transceivers 104a and 104b to show the coverage area achieved by those transceivers on the second planar area (e.g. the plane in which a client device is likely to be positioned). A LiFi client device is shown positioned in the second planar area. The optical coverage area 204 of the client device 106 for both transmitting and receiving Li-Fi signals is projected onto the first planar area (e.g. the ceiling). It should be understood that the first planar area and second planar area are intended to be orientated parallel to each other.

An arrow 206 depicts a possible direction of movement of the client device 106. As the client device 106 moves so does the projected coverage area 204 in the first planar area. It can therefore be seen that as the client device 106 moves within the environment 100 it may occupy a position where multiple access point transceivers (e.g. transceivers 104a and 104b), may be located within the coverage area 204, and thus multiple optical signals may be detected at the client device at any one time.

FIG. 3 shows a plan view of how the coverage areas 202 of each individual access point transceiver 104 can be arranged to cover a wider area (for example as disposed on a second planar surface at desk level from transceivers at ceiling level). The dotted circle 302 illustrates the boarder of coverage area 204 of the client device 106 directed upward and incident on a first planar area e.g. at ceiling level. As shown in FIG. 2, FIG. 3 also shows arrow 206 to illustrate a possible direction of movement of the client device 106 within the environment 100.

SUMMARY

A problem with the typical system as described above is that receiving multiple transmitted signals from multiple infrastructure network nodes at a client device can result in interference between the received signals. This interference can have a detrimental effect on the data transfer speed that may be achieved within the wireless optical communications system. Therefore it is desirable to optimally design the client device transceiver (or receiver) to mitigate and reduce the possibility of interference and increase the potential for high speed optical data transfer. Additionally, although a LiFi access point infrastructure may provide full coverage at the plane of the LiFi device, the LiFi-device must also provide a large enough coverage area at the plane of the LiFi access points.

A plurality of problems can occur when using a typical wireless optical communications system configured as described above. These problems may include the following.

Coverage—the LiFi client device may not always be able to see a LiFi access point depending on its location, the positioning of the LiFi access points, and the size of the LiFi client device's transducer/sensor coverage area.

Power consumption—A LiFi client device with a transceiver covering a large area may consume a lot of power and produce a lot of heat.

Downlink interference—A LiFi client device that is in the overlapping coverage area of multiple optical downlinks experiences interference if these LiFi access points transmit at the same time.

Uplink interference—A LiFi client device that transmits a signal to a LiFi access point while another LiFi client device is transmitting to this same LiFi access point results in uplink interference at the LiFi access point.

Handover—A LiFi client device that moves from the coverage area of one LiFi access point to a neighbouring LiFi access point can experience a period in which it has no connection. For example, when insufficient time is available to prepare and establish a link to the new LiFi access point before the link with the existing LiFi access point is broken.

Embodiments disclosed herein may address any one, more or all of the above problems.

According to a first aspect disclosed herein, there is provided a client device for use in an optical wireless communication network, the network comprising a plurality of infrastructure nodes arranged on intersections of a grid structure in a first plane and configured to provide access points of the network, the grid structure comprising quadrilaterals each with an x-axis dimension equal to d1, a y-axis dimension equal to d2, and a diagonal dimension equal to d3, where d2 is greater than or equal to d1. The client device comprises: an upward facing optical transducer configured to detect or transmit an optical wireless transmission from or to the network respectively, the transducer arranged to have a coverage area with at least two concentric segments; and a portion of the transducer configured to provide an outermost segment of the at least two concentrically arranged segments dimensioned such that: when the client device is positioned in a second plane parallel to the first plane and at a distance from the first plane, said segment's coverage area has a maximum radius (Ro) at said first plane greater than 0.5*d3. The infrastructure nodes may for example be ceiling-mounted access points or network devices of an optical wireless network offering similar functionality.

In embodiments, said distance (h) may have a value between d1 and 1.5*d1. In embodiments, said distance (h) may have a value between 1.5*d1 and 2.25*d1.

In embodiments, the portion of the transducer configured to provide an outermost segment of the at least two concentric segments may be dimensioned such that: the angle at the transducer between an outer edge of the outermost segment and the normal to the plane of the transducer, with a plane of the coverage area perpendicular to said normal and at a distance from the transducer, is larger than 31 degrees, optionally larger than 42; or the angle at the transducer between an outer edge of the outermost segment and the normal to the plane of the transducer, with a plane of the coverage area perpendicular to said normal and at a distance from the transducer, is larger than 22 degrees, optionally larger than 31 degrees.

In embodiments said plane of the coverage area may be formed at a distance (h) from the transducer of between 1.8 meters to 2.7 meters and with the dimension d1 equal to 1.8 meters. In embodiments where d1 is 1.8 meters said angle is preferably larger than 37 degrees. In embodiments said plane of the coverage area may be formed at a distance (h) from the transducer of between 1.8 meters to 2.7 meters and with the dimension d1 equal to 1.2 meters. In embodiments where d1 is 1.2 meters said angle may be preferably larger than 26.6 degrees.

In embodiments, the portion of the transducer configured to provide an outermost segment of the at least two concentric segments may be dimensioned such that: the angle at the transducer between an outer edge of the outermost segment and the normal to the plane of the transducer, with a plane of the coverage area perpendicular to said normal and at a distance from the transducer, is smaller than 45 degrees, optionally smaller than 33.7 degrees; or the angle at the transducer between an outer edge of the outermost segment and the normal to the plane of the transducer, with a plane of the coverage area perpendicular to said normal and at a distance from the transducer, is smaller than 33.7 degrees, optionally smaller than 24 degrees.

In embodiments said plane of the coverage area may be formed at a distance (h) from the transducer of between 1.8 meters to 2.7 meters and with the dimension d1 equal to 1.8 meters. In embodiments where d1 is 1.8 meters said angle may be preferably smaller than 38 degrees.

In embodiments said plane of the coverage area may be formed at a distance from the transducer of between 1.8 meters to 2.7 meters and with the dimension d1 equal to 1.2 meters. In embodiments where d1 is 1.2 meters said angle may be preferably smaller than 27.6 degrees.

In embodiments, the portion of the transducer configured to provide the outermost segment of the at least two concentric segments may be dimensioned such that the outermost segment of the at least two concentrically arranged segments is split into further segments circumferentially, each bounded by the maximum radius (704) of the outermost concentric segment, the maximum radius of the innermost concentric segment (706), and two radial lines extending from the centre of the coverage area to the maximum radius of the outermost segment, wherein: the two radial lines are separated by an angle (y) less than 43.4 degrees; optionally wherein the two radial lines are separated by an angle (y) less than 43 degrees.

In embodiments, the portion of the transducer configured to provide the outermost segment of the at least two concentric segments may be dimensioned such that the outermost segment of the at least two concentrically arranged segments is split into further segments circumferentially, each bounded by the maximum radius of the outermost concentric segment, the maximum radius of the innermost concentric segment, and two radial lines extending from the centre of the coverage area to the maximum radius of the outermost segment separated by an angle (y) less than 60 degrees.

In embodiments, the portion of the transducer configured to provide the outermost segment may be dimensioned such that the circumferential segments overlap with neighbouring circumferential segments by an angle theta.

In embodiments, the angle between the radial lines may remain the same, e.g. to keep the segment small enough to fulfil the 'small enough' requirement, but the number of segments increases to cover the outer segment and account for the overlap.

In embodiments, the portion of the transducer configured to provide an innermost segment of the at least two concentric segments may be dimensioned such that: the angle (a) at the transducer between an outer edge of the innermost segment and the normal to the plane of the transducer, with a plane of the coverage area perpendicular to said normal and at a distance from the transducer, is between 16.7 degrees and 18.4 degrees; or the angle (a) at the transducer between an outer edge of the innermost segment and the normal to the plane of the transducer, with a plane of the coverage area perpendicular to said normal and at a distance from the transducer, is between 11.3 degrees and 12.5 degrees.

In embodiments said plane of the coverage area may be formed at a distance (h) from the transducer of between 1.8 meters to 2.7 meters and with the dimension d1 equal to 1.8 meters. In embodiments where d1 is 1.8 meters said angle is preferably between 16.7 degrees and 18.4 degrees. In embodiments said plane of the coverage area may be formed at a distance (h) from the transducer of between 1.8 meters to 2.7 meters and with the dimension d1 equal to 1.2 meters. In embodiments where d1 is 1.2 meters said angle may be preferably between 11.3 degrees and 12.5 degrees.

In embodiments, the transducer may be configured to provide one or more middle concentrically arranged segments between the innermost and outermost concentrically arranged segments.

In embodiments, the one or more middle segments may be split into further segments circumferentially. These may or may not align with the circumferential segments of neighbouring concentric segments.

According to a second aspect disclosed herein, there is provided a system configured to provide an optical wireless communication network comprising: a plurality of infrastructure nodes arranged on intersections of a grid structure in a first plane and configured to provide access points of the network, the grid structure being comprised of quadrilaterals (preferably equiangular) each with an x-axis dimension equal to d1, a y-axis dimension equal to d2, and a diagonal dimension equal to d3, where d2 is greater than or equal to d1. The system further comprises at least one client device comprising: an upward facing optical wireless transducer for receiving or transmitting optical wireless signals from or to the network respectively, the transducer arranged to have a coverage area with at least two concentric segments; wherein an outermost segment of the at least two concentric segments is dimensioned such that, when the client device is positioned in a second plane parallel to the first plane and at a distance from the first plane, said segment's coverage area has a maximum radius, Ro, at said first plane greater than 0.5*d3.

That is, upward facing in that when the transducer is located within the front face of the client device and the client device is placed with its back face on a surface in the horizontal plane, the front face comprising the transducer plane is in an upward facing orientation over the majority of its surface. For example, if the grid structure is on the ceiling of a room and the client device is on a table in that room, the transducer is in a plane parallel to the ceiling and pointed towards it.

Note that "upward" herein means facing toward the network of nodes. Typically these are located in the ceiling or above the user, in which case "upward" also means in the opposite direction to gravity. The converse meaning is given to "downward".

In embodiments, d1 may be 1.8 meters and h may have a value between d1 and 1.5*d1.

In embodiments, d1 may be smaller (e.g. 1.2 m), and as such h may be between 1.5*d1 and 2.25*d1.

In embodiments, the transducer may be arranged such that the outmost segment of the at least two concentric segments is dimensioned such that, when the client device is positioned in a second plane parallel to the first plane and at a distance from the first plane, said segment's coverage area has a maximum radius, Ro, at said first plane of a value less than d1.

In embodiments, said distance (h) may have a value between d1 and 1.5*d1. In embodiments, said distance (h) may have a value between 1.5*d1 and 2.25*d1.

In embodiments, the transducer may be arranged such that an innermost segment of the at least two concentrically arranged segments is dimensioned such that, when the client device is positioned in a second plane parallel to the first plane and at a distance from the first plane, said segment's coverage area has a maximum radius, Ri, at said first plane of a value greater than 0.3*d1.

In embodiments, h may have a value between d1 and 1.5*d1. In embodiments, d1 may be smaller and thus h may have a value between 1.5*d1 and 2.25*d1.

The symbol * is used to denote scalar multiplication of a numerical value and the absolute magnitude of the length d1. The value 0.3 may be the decimal value for one third having been rounded to one significant figure. It should be appreciated that in embodiments the same value may be represented by the fraction ⅓. Similarly, the same value may be represented by the decimal value rounded to more significant figures such as 0.33, 0.333 etc.

In embodiments, the transducer may be arranged such that the innermost segment of the at least two concentrically arranged segments is dimensioned such that, when the client device is positioned in a second plane parallel to the first plane and at a distance from the first plane, said segment's coverage area has a maximum radius, Ri, at said first plane of a value less than half the value of d1.

In embodiments, h may have a value between d1 and 1.5*d1. In embodiments, h may have a value between 1.5*d1 and 2.25*d1.

In embodiments, the transducer may be arranged such that the outermost segment of the at least two concentrically arranged segments is split into further segments circumferentially, each bounded by the maximum radius of the outermost concentric segment, Ro, the maximum radium of the innermost concentric segment, Ri, and two radial lines extending from the centre of the coverage area to the maximum radius of the outermost segment, and separated by an angle where the chord formed between the points of intersection of the radial lines with the maximum radius of the outermost segment has a length less than d1.

In embodiments, each of the circumferential segments may overlap with their respective neighbouring circumferential segments, but not overlap with any inner concentric segment.

In embodiments, each of the circumferential segments may be separated from neighbouring circumferential segments by a wall perpendicular to the surface of the transducer.

In embodiments, the wall may comprise a reflective material.

According to another aspect disclosed herein, there is provided an infrastructure node device for use with a an optical wireless communication network comprising a plurality of infrastructure nodes arranged on intersections of a grid structure in a first plane and configured to provide access points of the network and a client device in a second plane, the grid structure comprising quadrilaterals each with an x-axis dimension equal to d1, a y-axis dimension equal to d2, and a diagonal dimension equal to d3, where d2 is greater than or equal to d1. The infrastructure node device comprises: a downward facing optical wireless transducer, the transducer being arranged to have a coverage area with at least two concentric segments; and an outermost segment of the at least two concentrically arranged segments dimensioned such that, when the client device is positioned in a second plane parallel to the first plane and at a distance, said segment's coverage area has a maximum radius, Ro, at said second plane greater than 0.5*d3.

In embodiments, said distance (h) may have a value between d1 and 1.5*d1. In embodiments, said distance (h) may have a value between 1.5*d1 and 2.25*d1.

In any aspect mentioned above or elsewhere herein, the transducer of the client device may comprise a receiver, in which case the optical wireless signal comprises a downlink signal from the network to the client device. Alternatively or additionally, the transducer of the client device may comprise a transmitter, in which case the optical wireless signal comprises an uplink signal from the client device to the network.

BRIEF DESCRIPTION OF THE DRAWINGS

To assist understanding of the present disclosure and to show how embodiments may be put into effect, reference is made by way of example to the accompanying drawings in which:

FIG. 11 shows a LiFi device sensor coverage area comprising six circumferential (or type B) segments and two concentric (or type A) segments (the outermost concentric segment comprising the circumferential segments).

DETAILED DESCRIPTION OF EMBODIMENTS

It is beneficial for a LiFi client device to transmit a modulated light-signal with a limited coverage area (light beam). It saves power, improves the signal to noise ratio, and enables better separation of communication links to reduce interference.

The inventors have realized that by designing a sectorized LiFi client device (e.g. with multiple LiFi transceivers), each "sector" covering a different portion of the total coverage area of the LiFi client device, a LiFi client device can be designed which also solves one or more other problems as described above with regard to the typical wireless optical communication systems. For instance these may be as follows.

Coverage—A LiFi access point may provide full coverage at the second plane. However, a LiFi client device in that second plane may not be able to establish a communication link to a LiFi access point if the client device has too small a coverage area in the first plane containing the LiFi access points.

Power consumption—A LiFi client device with a transceiver covering a large area may consume a lot of power and produce a lot of heat. This may be too much to make the device useful to a user by having too short a battery life and being uncomfortably hot to use.

Figure 1:
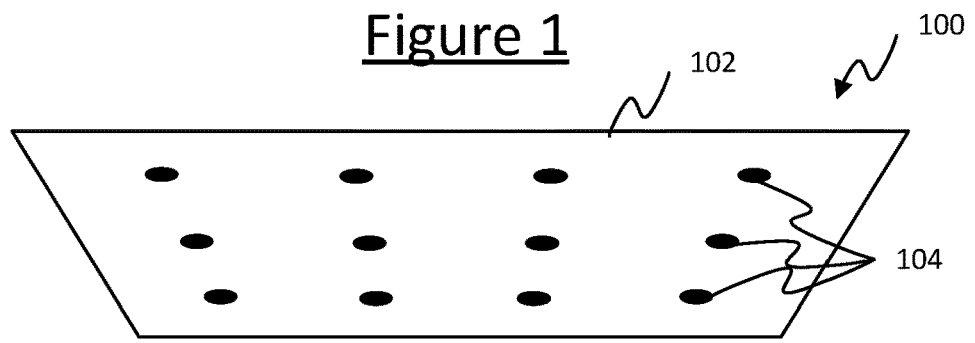
FIG. 1 shows an environment with a LiFi system comprising a LiFi infrastructure with multiple LiFi access points and a LiFi client device.
Figure 2:
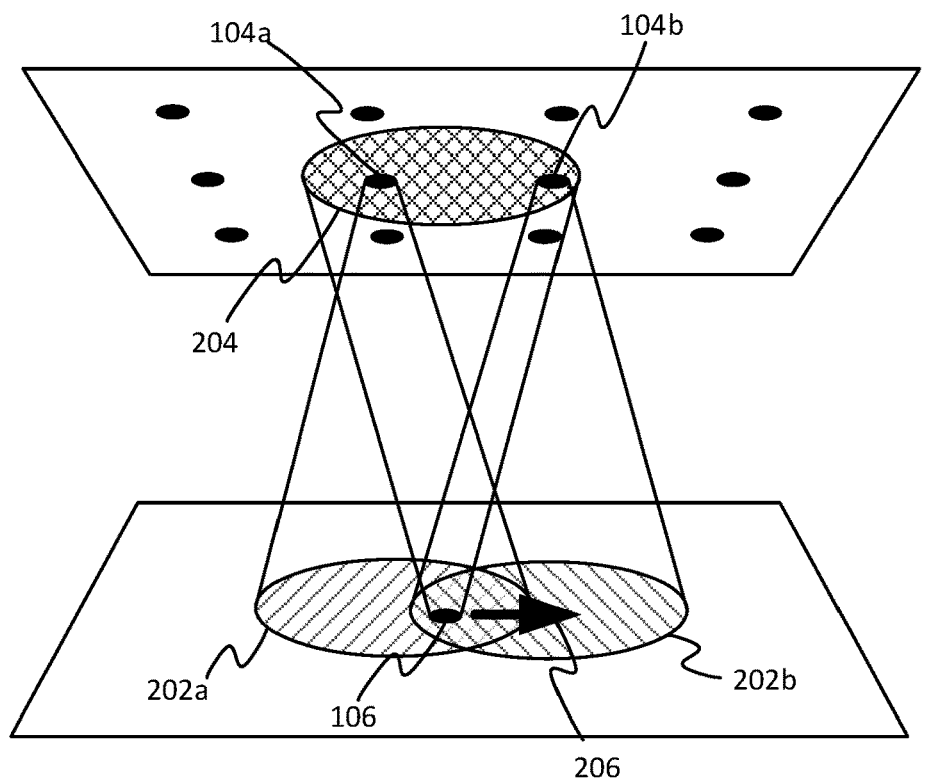
FIG. 2 shows an environment with a LiFi system comprising a LiFi infrastructure with multiple LiFi access points and a LiFi client device, where two of the access points and the client device each have a coverage area.
Figure 3:
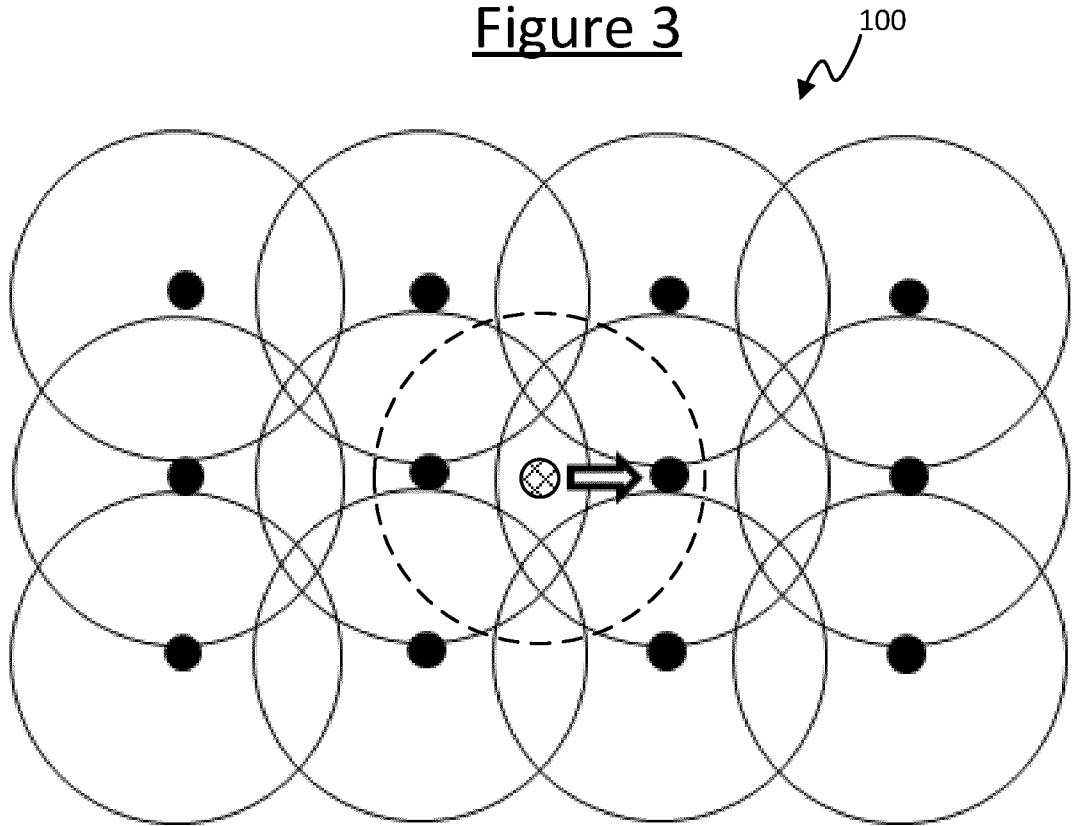
FIG. 3 shows a plan view of the coverage areas of each individual access point of the infrastructure of FIGS. 1 and 2, and how they can be arranged to cover a wider area.
Figure 4A:
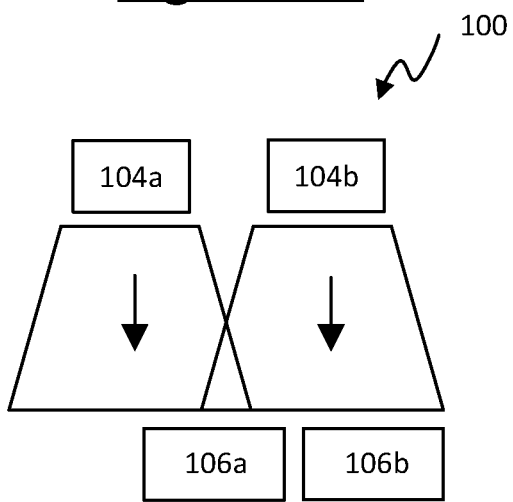
FIG. 4A shows an example of downlink interference, where a LiFi client device is in the overlapping coverage area of multiple optical downlinks and experiences interference if these LiFi access points transmit at the same time.

Downlink interference—A LiFi client device that is in the overlapping coverage area of multiple optical downlinks experiences interference if these LiFi access points transmit at the same time. For example, see FIG. 4A, where a first LiFi client device 106a has established a communication link with a first access point 104a, and a second LiFi client device 106b has established a communication link with a second access point 104b. Because the first device is also in the coverage area of the second access point 104b, this second access point 104b interferes with the downlink communication of the first access point 104a to the first device 106a. It is an objective of embodiments of the present invention to mitigate or prevent this downlink interference at the device 106a.

Figure 4B:
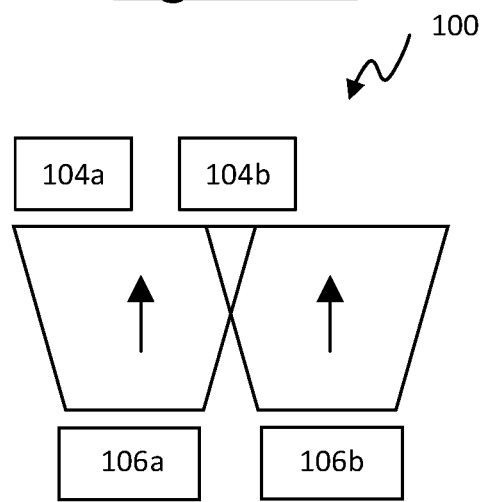
FIG. 4B shows an example of uplink interference, where a LiFi client device that transmits a signal to a LiFi access point while another LiFi client device is transmitting to this same LiFi access point causes uplink interference at the LiFi access point.

Uplink interference—A LiFi client device that transmits a signal to a LiFi access point while another LiFi client device is transmitting to this LiFi access point causes uplink interference. For example, see FIG. 4B, a first LiFi client device 106a has established a communication link with a first LiFi access point 104a and a second LiFi client device 106b has established a communication link with a second LiFi access point 104b. Because the second access point 104b is also in the coverage area of the first device 106a, the first device 106a interferes with the uplink communication of the second device 106b to the second access point 106b. It is an objective of embodiments of the present invention to mitigate or prevent this uplink interference at the second access point 104b.

Handover—A LiFi client device that moves from the coverage area of one LiFi access point to a neighbouring LiFi access point can experience a period in which it has no connection. For example, this may occur when insufficient time is available to prepare and establish a link to the new LiFi access point before the link with the existing LiFi access point is broken.

The LiFi client device may move in the plane of the second plane and therefore change its position within the coverage areas of the LiFi access points as well as change the position of its own coverage area in the first plane. The LiFi client device may also have different vertical positions in relation to the second plane.

Figure 5:
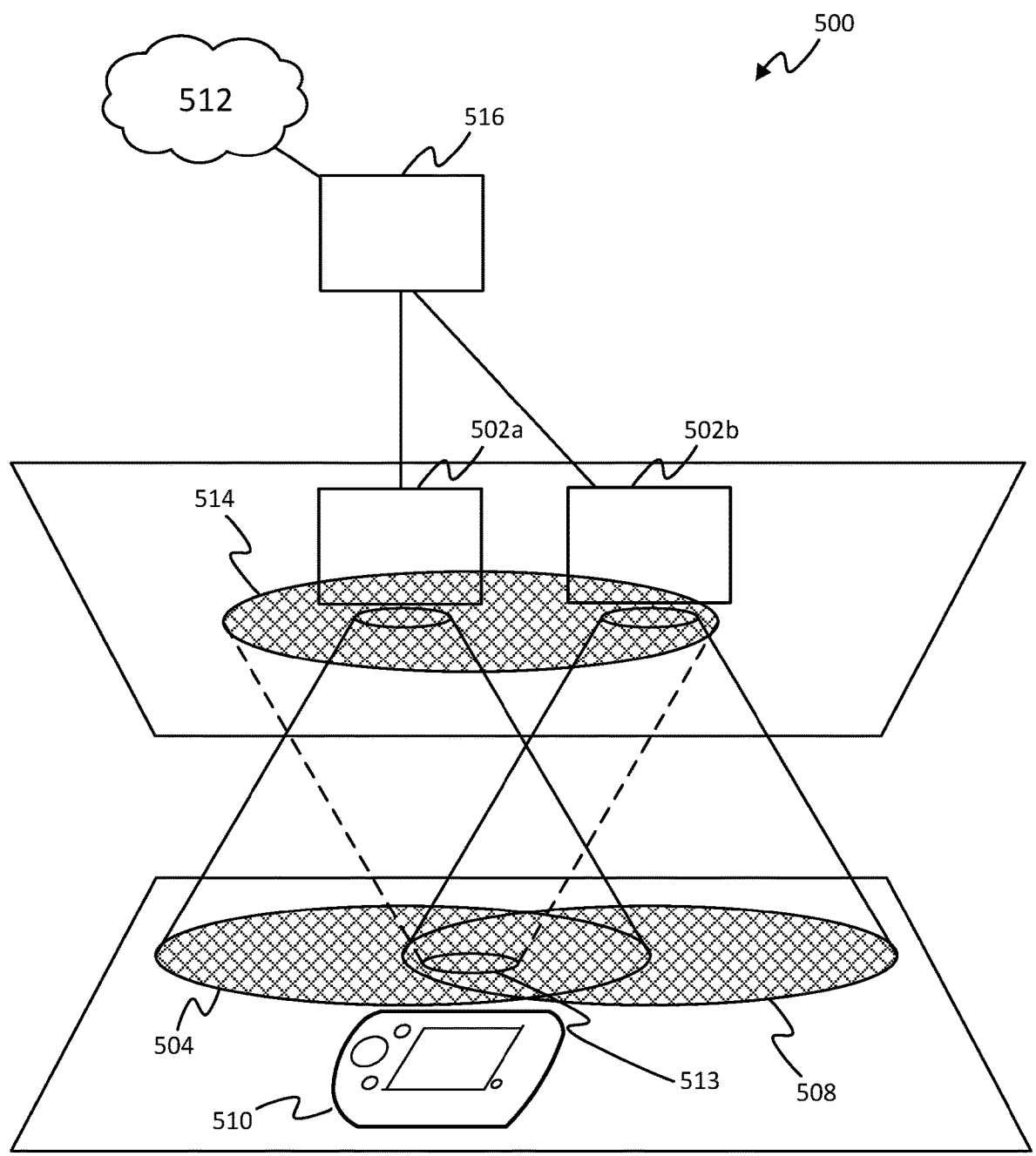
FIG. 5 shows a schematic diagram of the optical wireless communication system.

FIG. 5 shows a schematic diagram of the optical wireless communication system 500. The system comprises one or more access points 502a, 502b located in a first plane. Each access point provides a respective coverage area 504, 508 in a second plane by emitting a beam of light to transmit data. The system also comprises a LiFi client device 510 in a second plane. The LiFi client device 510 comprises a sensor 513 which is configured to provide a coverage area 514 in the first plane. The access points 502a, 502b may be connected to one or more infrastructure modems (not shown). Each access point 502a, 502b may also be connected to a network 512.

A LiFi-modem (not shown) can be connected to a single LiFi access point of the infrastructure, or to multiple LiFi access points of the infrastructure (e.g. one or more access point transceivers connected to one or more LiFi modems). Thus in some embodiments a single LiFi access point may be connected to multiple LiFi modems. The modem may handle the plurality of transceiver signals for establishing a communication link as one coherent signal, or may handle them as (at least partially) separate incoherent signals. The modem may therefore transmit the same data signals from all access points it's connected to, or parts of the same data via different signals of the different access points it's connected to. Therefore, a single modem may be the only modem connected to plurality of access points, or a single modem may be connected to a plurality of access points which may also each be connected to a plurality of other modems.

The LiFi receiver device 510 can be any of the above mentioned devices which are capable of receiving data transmitted by optical wireless transmission methods. For example, it may be an electronic device such as a laptop, tablet, smartphone, etc. It should be understood that any LiFi device which comprises the appropriate light sensor 513 is capable of receiving data via the present system 500. That is, any suitable light sensor 513 able to convert incident beams of light into a data signal for processing. The light sensor 513 may be a dedicated photocell (point detector), or comprise an array of photocells (pixels) and a lens for forming an image on the array. The light sensor 513 may be a dedicated photocell (point detector), or an array of photocells included in a dongle which plugs into a receiver device 510 such as a smartphone, tablet, or laptop. This enables the LiFi receiver device 510 to receive data via the beam of light. The receiver 510 may also transmits data by emitting a beam of light to transmit data.

The controller 516 may be operatively coupled to the at least two access points 502a, and 502b, and is configured to provide control data to the one or more access points and one or more modems The controller 516 may be connected to multiple modems (via separate lines or via e.g. an ethernet switch) and a modem may be connected to multiple transceivers/optical frontends. This means that the controller may directly control the modems and may control the transceivers via the modems.

The sensor 513 is orientated upwardly in the system 500 as shown in FIG. 5. In the system 500 depicted in FIG. 5 the optical wireless signals are transmitted by access points 502a and 502b positioned on the ceiling. Therefore the transmitters are positioned in a downward facing direction, which requires the sensor to be positioned in an upward facing direction. That is, the sensor detects light which falls on it from, or is incident from, an upward direction, e.g. in the direction of gravity. The sensor is therefore described as upward facing. In embodiments, the term 'upward' may simply mean towards the source of the light, e.g. the infrastructure transmitters or access points (i.e. the nodes of the network), and towards whatever direction the optical transmissions may be directed from. For example, the term facing is used to mean that the relevant item (e.g. the area of the sensor used for detection of light), is pointing towards the access point(s) so as to optimally detect transmitted light emitted from the access points.

FIG. 5 shows an example of a wireless optical data transmission system 500 comprising a plurality of access points 502a, 502b. Each access point is connected to the controller 516. It should be understood that the connection of each access point to the controller 516 could be enacted by connecting the access points to each other, e.g. chained together by respective connections or connected in series, where only one of the access points is then connected directly to the controller 516; or by connecting each access point to the controller 516 via individual separate connections, as shown in FIG. 5; or by any combination of the two. In embodiments the controller 516 may be distributed and located partially within each of the access points 502a, 502b of the system 500.

A LiFi device may have a single LiFi device modem (not shown) for both transmitting and receiving data. The LiFi device may also have one or more LiFi client device transmitters and one or more LiFi client device receivers (e.g. sensors), connected via multiplexers to the LiFi client device modem. The receivers (e.g. sensors) and transmitters form parts of the client device transceivers.

For the purposes of discussing the shapes of the coverage area of the LiFi device sensor it is assumed that the sensor coverage area shape is mirrored by the sensor device which provides it. However, it should be understood that the shape of the coverage area may be provided by any arrangement of one or more sensor(s) or sub-sensors of the LiFi device to provide the desired one or more segments of the coverage area belonging to the LiFi client device sensor, but may themselves be differently shaped or arranged. The segments may be arranged with a plurality of photodiodes (e.g. in the centre and around the centre), and with a single optical lens. The segments may be arranged with at least two photodiodes (e.g. with no specific spatial relationship), each with a different lens: one for the innermost segment and one for the outermost segment. The segments may be created using a combination of these methods. For example, using a plurality of photodiodes arranged in the centre and around the centre, but each with a different lens: one for the innermost segment and one for the outermost segment. The sensors or sub-sensors may be physically separated, but may have no gap or a very small gap between them (e.g. between the sensors or sub-sensors which provide one or more of the different coverage area segments). An optical lens may direct each segment of the coverage area of a sub-sensor to a specific position. In embodiments the coverage area of the outermost concentric segment may have neighbouring circumferential segments within it which overlap.

Figure 6:
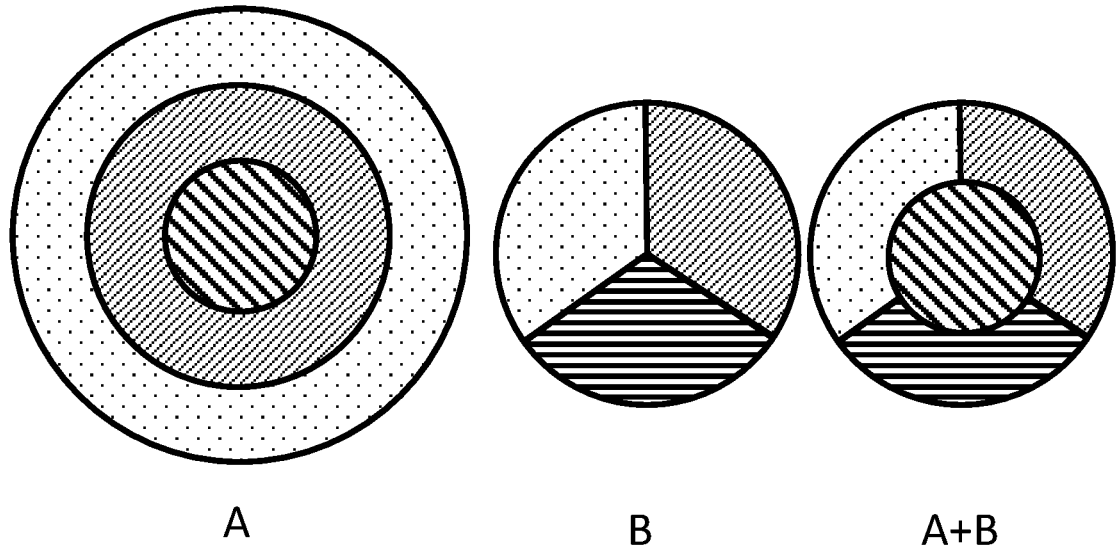
FIG. 6 shows three examples of how a LiFi sensor may be arranged to form optical segments in a coverage area of the sensor.

FIG. 6 shows three examples of how the one or more LiFi sensor(s) may be arranged to form optical segments in a coverage area of the sensor. For example, each segment may have its own coverage area in the first plane, and which is smaller than the total coverage area of the one or more LiFi device sensors in the first plane. This arrangement can be used to mitigate the interference of multiple LiFi access point downlink communications when the LiFi client device is present in the overlapping coverage area of multiple LiFi access points.

To prevent, or at least mitigate, the interference of multiple LiFi access point downlink communications, the segments can be arranged such that at least one or a combination of multiple segments can be selected as having a coverage area at the first planar area where only a single LiFi access point occurs. For example, referring back to FIG. 5, it can be seen that the sensor 513 has a coverage area in which both of the access points 502a and 502b occur. Thus by segmenting the coverage area, different LiFi downlink signals from different access points can be received by the sensors responsible for providing the different segments of the sensor coverage area.

Similarly, the one or more LiFi client device transmitters may be arranged in optical segments, each with a small coverage area in the first plane to mitigate the interference of multiple LiFi client device uplink communications when a LiFi access point is present in the overlapping area of multiple LiFi client devices. This also enables the power for the uplink to be reduced, as each uplink signal requires less power to cover a smaller coverage area. To solve, or at least mitigate, the interference of multiple LiFi-device uplink communications, the segments can be dimensioned and arranged such that at least one of them can be selected as having a coverage area in the first plane in which only a single LiFi access point occurs.

The total coverage area of the LiFi client device in the first plane is represented in FIGS. 2-3, and 5-7, 9, 10A and 11 by a circle. However, this is just an example of the coverage area shape, and it could be in the shape of any other suitable polygon.

In FIG. 6 the example arrangements of the segments of the coverage area of a sensor are as follows.

An example type 'A' arrangement of concentric segments, e.g. a center segment and one or more ring segments. That is, where the borders of each segment are determined by an inner and outer concentric circle or polygon.

An example type '13' arrangement of angular segments or pie segments. That is, where the borders of each segment are determined by a center and an outer circle or polygon, with additional radial lines having a particular angle between them.

An example combination of type A and type B arrangements of angular and concentric segments to form an A+B type arrangement. That is, where concentric segments are formed between concentric polygon boarders, where one or more of the concentric segments are then further split into circumferential segments by radial lines or parts of radial lines. For example, the arrangement shown in the far right hand side of FIG. 6 labelled A+B.

In embodiments the segments may have some overlap. The overlap may assist in processes such as the handover of data exchange between the client device and the infrastructure transceiver (network node) from one segment to another neighboring segment. The handover may be between segments of the client device or of similar segments of the infrastructure transceiver (or sensor).

Alternatively or additionally the segments may have underlap. That is to say there may be a gap between certain segments. The gap between segments may be provided by another segment which is inactive in between active segments. The inactive segment may overlap with neighboring active segments, but the active segments may not overlap. There may be a gap between some segments while there is overlap between other segments.

A particular combination of the above described arrangements may be used with a multi-segment coverage area sensor such that neighboring segments may be used to create segment clusters. That is, a plurality of segments may be combined together, for example by overlapping them or activating already overlapping segments, while gaps are left between the different clusters of segments. For example by design of gaps between certain segments or segment clusters, or deactivation of particular medial segments. These types of arrangements can be used to make various combinations of segments to provide minimal interference and best use of the energy e.g. at the client device, by using fewer segments to detect only the visible part of the transmission from an access point towards the client device.

Figure 7:
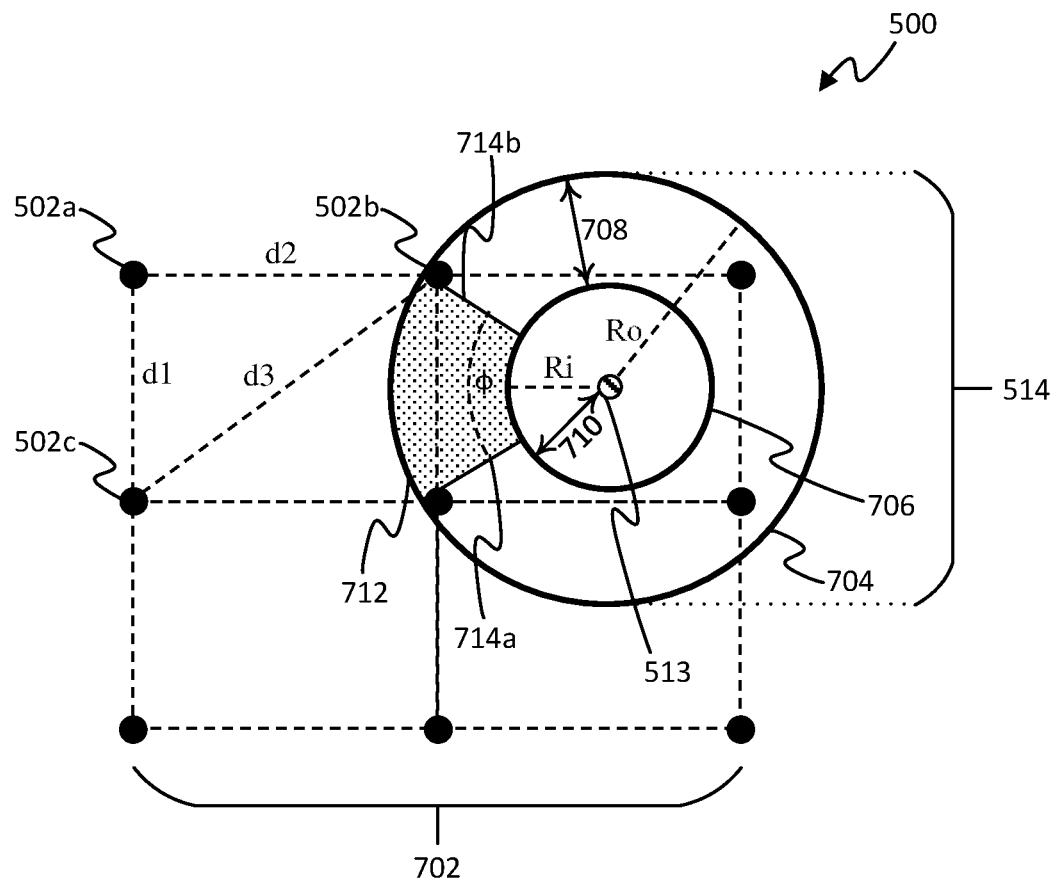
FIG. 7 shows an example of a LiFi system with an access point infrastructure and a LiFi device sensor coverage area with concentric segments.

FIG. 7 shows a LiFi system 500 with access point infrastructure 502 and a LiFi device 513. The infrastructure comprises LiFi infrastructure transceivers 502a, 502b, and 502c. The access points 502 lie on the vertices of a grid 702 of rectangles, where each rectangle of the grid 702 has the side dimensions d1 and d2, and a diagonal dimension d3. The shorter side of each rectangle has the dimension d1 and the longer side has the dimension d2. In embodiments, d2 is larger than or equal to d1. FIG. 7 shows an example infrastructure comprising nine access points 502 in a rectangular arrangement. It should be understood that the access points 502 can be arranged in any regular pattern. Similarly, a plurality of access points can form the vertices of any type of polygon, for example a square, a circle, a hexagon, a pentagon, an octagon, a triangle, etc. The regular pattern may be formed of one or more types of polygon tessellated together to cover a larger area as exemplified in FIG. 7.

The LiFi device 513, represented by a striped circle in the top right quadrant of the grid 702, has a total sensor coverage area 514. The outermost border of the coverage area 514 is indicated by a circle 704 with radius Ro. The example coverage area 514 in FIG. 7 also comprises an inner concentric circle 706 with radius Ri. The outermost circle 704 and the innermost circle 706 together define the boundaries of an outermost A type concentric segment 708 of the coverage area 514. The area between the LiFi device 513 and the inner circle 706 define the boundaries of an innermost type A concentric segment 710 of the coverage area 514. The outermost type A segment 708 and the innermost type A segment 710 are arranged as two concentric segments.

It should be understood that the coverage area 514 may comprise two or more concentric segments with multiple concentric circles forming the boundaries between them. The terms outermost and innermost relate to the concentric segments with the maximum Ro and minimum Ri radii respectively.

The outermost type A concentric segment 708 may be further split into type B segments or circumferential segments. One such circumferential segment 712 is shown in FIG. 7. The boundaries of the circumferential segment 712 comprise two lines 714a, 174b extending radially outward from the client device 513 to the outermost circle 704 with an angle between the radial lines of $\phi$. It should be understood that any type A concentric segment may be split into a plurality of circumferential segments, not just the outermost segment 708.

In the example circumferential segment 712 in FIG. 7 the circle 706 with minimum radius Ri forms the inner boundary of the segment 712. However, it should be appreciated that the inner boundary may be formed by a circle or outer boundary of a concentric segment other than the innermost concentric segment, i.e. where the coverage area 514 comprises more than two concentric segments.

As described above, by dividing the sensor coverage area into segments it is possible to create a sensor area dimensioned such that only the LiFi data transmitted by a single one of the infrastructure transceivers is received within any one segment of the coverage area of the LiFi sensor at any one time. Thus interference between data received from multiple transceivers is mitigated if not eliminated altogether. It is also possible to define alternative or additional constraints on the system in order to fulfil one or more related criteria for mitigating interference. These will be discussed in turn below.

The stipulations on the dimensions of the coverage area of the sensor of the client device 513 depend heavily on the dimensions of the LiFi infrastructure. However, it is possible to determine absolute values for these dimensions by assuming certain typical dimensions of the infrastructure. This is exemplified herein below.

The dimensions of the coverage area and its segments (concentric and circumferential) depend on e.g. the distances between the access points (d1, d2), and the distance from the client device to the access point (h). Below is an example of the numerical constraints on the angle $\beta$, formed at the sensor between the normal of the sensor plane towards the plane of the coverage area and a line connecting the sensor to the maximum radius of the coverage area e.g. the edge of the outermost concentric segment, along with the instigating infrastructure dimensions from which they are derived. In reality these constraints equally apply to a sensor on a client device or a sensor on an access point.

At h=1.8 m, d1=1.8 m, d2=2.7 m, $\beta$ should be larger than 42 degrees.

At h=2.7 m, d1=1.8 m, d2=2.7 m, $\beta$ should be larger than 31 degrees.

At h=2 m, d1=1.8 m, d2=2.4 m, $\beta$ should be larger than 37 degrees.

At h=1.8 m, d1=1.2 m, d2=1.8 m, $\beta$ should be larger than 31 degrees.

At h=2.7 m, d1=1.2 m, d2=1.8 m, $\beta$ should be larger than 22 degrees.

At h=2 m, d1=1.8 m, d2=1.6 m, $\beta$ should be larger than 26.6 degrees.

Figure 8:
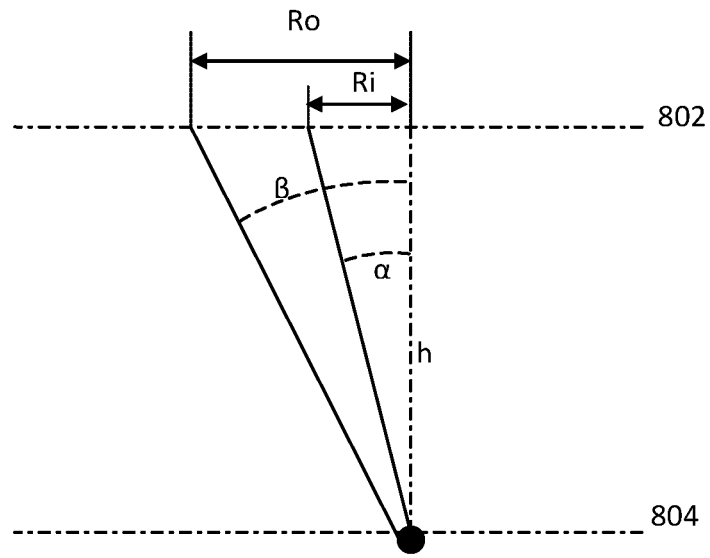
FIG. 8 shows a side view of the LiFi system indicating the distance h between a first plane and a second plane, the corresponding optical coverage angle α for a segment with maximum radius Ri and the corresponding coverage angle β for a segment with maximum radius Ro of the example system shown in FIG. 7.

FIG. 8 shows a side view of the system 500 indicating the distance h between a first plane 802 and second plane 804, the corresponding optical coverage angle $\alpha$ for a segment with maximum radius Ri and the corresponding coverage angle $\beta$ for a segment with maximum radius Ro.

For the below examples used to explain embodiments of the invention, it has been assumed that for the LiFi infrastructure each LiFi modem is connected to a single LiFi access point (transceiver) and each LiFi access point is connected to a single LiFi modem. Also, the LiFi access points are placed at the vertices of a rectangular grid in the first plane, whereby:

the ratio of the rectangular sides is: d1≤d2≤1.5*d1
the distance of the device to the first planar area is according to: d1≤h≤1.5*d1
Numerical examples of these relationships are e.g. for
d1=1.8 m
1.8 m≤d2≤2.7 m
1.8 m≤h≤2.7 m It can be seen from FIGS. 7 and 8 that by dimensioning the coverage area of the sensor of the LiFi client device in particular ways e.g. with particular limitations, the number of LiFi access points detected can be controlled to mitigate or prevent interference.

At least one of the following constraints can be applied, where each constraint assists in preventing a deficiency in the system in a particular way as follows.

Firstly, in embodiments it is desirable to have the coverage area of the LiFi sensor cover at least one LiFi access point at all times. That is, wherever the client device is positioned within the system 500, the coverage area would overlap with at least one access point to provide LiFi data. It can be seen that in the example system infrastructure in FIG. 7 the LiFi client device is furthest from all LiFi access points when in the center of any one of the rectangles of the grid 702. Thus, using the above defined dimensions of the grid 702, and LiFi device coverage area, the coverage area should have a diameter larger than the diagonal dimension d3 of the rectangles to fulfil this particular requirement. Accordingly, the radius of the coverage area should be at least larger than 0.5*d3. This can be correlated to the largest dimension of the coverage area, or outermost segment 708. Therefore, the radius of the outermost segment Ro (when should be larger than 0.5*d3 to fulfil this particular requirement.

If considering what this means at the lower end of the range of h in a typical example infrastructure (as shown in FIGS. 7 and 8 and corresponding to the largest required value of β), we can suppose the device is at the minimum distance to the first plane (which includes the access points), and h=d1. Then, according to the geometry of FIG. 8:

$\beta=\arctan(Ro/h)$, or $>\arctan(0.5*d3/d1)$.

Knowing $d3^2=d2^2+d1^2$ then:
For d2=d1 (square grid): β>35.3°
For d2=1.5*d1 (rectangular grid): β>42.0°

Secondly, in embodiments it is desirable to have the coverage area of the LiFi sensor only cover at most LiFi access point which are direct neighbors at any one time. That is, wherever the client device is positioned within the system 500, the coverage area should not overlap with more than two access points in any one dimension (e.g. horizontally or vertically) providing LiFi data. In this way it is ensured that only LiFi data from access points which are direct neighbors is detected, and data from multiple distant access points is not detected. It can be seen that in the example system infrastructure in FIG. 7 the smallest dimension of the rectangles of the example grid is d1. Therefore the LiFi client device, when positioned at a first LiFi access point, is closest to a second LiFi access point along this d1 dimension direction. Therefore to prevent more than two access points being detected in at least this direction, and using the above defined dimensions of the grid 702 and LiFi device coverage area, the coverage area should have a radius smaller than the shortest side dimension d1 of the rectangles to fulfil this particular requirement. This can be correlated to the dimensions of the total coverage area, or outermost segment 708. Accordingly, the radius Ro of the outermost segment 708 should be smaller than d1.

If considering what this means at the higher end of the range of h in a typical example infrastructure (as shown in FIGS. 7 and 8, and corresponding to the largest value of Ro), we can suppose the device is at the maximum distance to the first plane (which includes the access points), and h=1.5*d1. Then, according to the geometry of FIG. 8:

$\beta=\arctan(Ro/h)$, or $<\arctan(d1/(1.5*d1))$:

Then we get β<33.7°.

Thirdly, in embodiments it is desirable to have the coverage area of the innermost segment 710 of the LiFi device cover one LiFi access point when centered on that access point sufficiently such that if moving in a small area around that access point it does not disconnect and reconnect too often. The reason for this is that if the innermost concentric segment only has to move a small amount off of centrally aligned with an access point before it disconnects or tries to handover to another access point, then the LiFi client device may not experience a very reliable connection in realistic use cases. Thus, when the LiFi client device is positioned directly at, or under, or parallel within a LiFi access point of the system 500, the coverage area of the innermost concentric segment should have some space within it before it no longer covers the LiFi access point. The amount of space, and correspondingly the determined minimum radius of the innermost concentric segment Ri, can be chosen based on the amount of expected local movement of the LiFi client device, or the comparative size of the device to the grid. For example, a mobile phone may move around on a desk surface. Therefore movement within a one to two meter range when optimally positioned by an access point should not trigger a disconnection.

It can be seen that in the example system infrastructure in FIG. 7 if the LiFi client device is positioned at the central LiFi access point, then the radius of the innermost concentric segment may be chosen to be greater than 0.3*d1 to provide an area around the LiFi access point within which the LiFi client device can move before disconnecting or a handover occurs. Thus, using the above defined dimensions of the grid 702, and LiFi device coverage area, the innermost segment coverage area should have a radius Ri larger than 0.3*d1. That is, the coverage area of a A-type concentric segment determined by a circle with radius Ri shall be larger than 30% of the shortest side of the rectangle: Ri>0.3*d1.

If considering what this means at the lower end of the range of h in a typical example infrastructure (as shown in FIGS. 7 and 8, and corresponding to the smallest value of Ri), we can suppose the device is at the minimum distance to the first plane (which includes the access points), and h=d1. Then, according to the geometry of FIG. 8:

$\alpha=\arctan(Ri/h)$, or for limiting $Ri$ to larger than values, $>\arctan(0.3*d1/d1)$ Then we get α>16.7°.

The selection of 30% is a choice depending on the above discussed factors. The chosen percentage of d1 may just as likely be 5%, 10%, 15%, etc. depending on e.g. the system configuration, infrastructure configuration, and the type of LiFi client device(s) used.

Fourthly, in embodiments it is desirable to have the coverage area of the innermost segment 710 of the LiFi sensor cover only one LiFi access point at any one time. This is to prevent interference in this central segment which may be used as the main coverage area segment for data transfer.

Additionally, it is desirable to have some gap before the innermost segment encounters another second LiFi access point. The reason for this is that if the innermost concentric segment only has to move a small amount off of centrally aligned with an access point before it encounters another access point, then the LiFi client device may attempt to start a pre-emptive process for, or execute, a handover to this other LiFi access point. If the LiFi client device continues to move around where neighboring access points frequently move into and then out of the coverage area, the handover processes can become disruptive to the connection. For example, handovers can take some time to execute, movement in the middle of the handover can result in disconnection from the network altogether, and processing power can be unnecessarily occupied to perform these undesired processes. Thus, when the LiFi client device is positioned directly at, or under, or parallel within a LiFi access point of the system 500, the coverage area of the innermost concentric segment should have some space around it before it covers the next nearest LiFi access point. The amount of space, and correspondingly the determined maximum radius of the innermost concentric segment Ri, can be chosen based on the amount of expected local movement of the LiFi client device, or the comparative size of the device to the grid. For example, a mobile phone may move around on a desk surface. Therefore movement within a one or two meter range when optimally positioned by an access point should not trigger a handover.

It can be seen that in the example system infrastructure in FIG. 7 if the LiFi client device is positioned centrally on the d1 dimension of the grid between two LiFi access points the innermost concentric segment should have a diameter of less than d1 to prevent the innermost segment of the coverage area from covering two LiFi access points at once. Thus, using the above defined dimensions of the grid 702, and LiFi device coverage area, the innermost segment coverage area 710 should have a radius Ri less than d1/2 or 0.5*d1 to fulfil this particular requirement.

If considering what this means at the higher end of the range of h in a typical example infrastructure (as shown in FIGS. 7 and 8, and corresponding to the largest value of Ri), we can suppose the device is at the maximum distance to the first plane (which includes the access points), and h=1.5*d1. Then, according to the geometry of FIG. 8:

$\alpha = \arctan(Ri/h)$ or for limiting $Ri$ to smaller than values, $<\arctan(0.5*d1/1.5*d1))$.

Then we get: $\alpha < 18.4°$.

Fifthly, in embodiments it is desirable to have a circumferential segment in an A+B type arrangement of the LiFi sensor cover only one LiFi access point at any one time. By implementing the circumferential segments the outermost concentric segment can be more advantageously dimensioned so as to cover only a single LiFi access point at once, rather than the above criteria of covering only LiFi access points which are direct neighbors. That is, wherever the client device is positioned within the system 500, the coverage area of the circumferential segment would cover only one access point to provide LiFi data.

It can be seen that in the example system infrastructure in FIG. 7 the LiFi client device is furthest from all LiFi access points when in the center of any one of the rectangles of the grid 702. However, this is also the position when the outermost concentric segment is most likely to cover multiple LiFi access points. By dividing the outermost concentric segment (and in embodiments with two or more concentric segments, other concentric segments as well), into circumferential segments, the coverage area can be reduced to cover only one LiFi access point. Thus, using the above defined dimensions of the grid 702, and LiFi device coverage area, the radial lines defining the sides of the circumferential segment should link an outer circle with radius 0.5*d3<Ro<d1, and inner circle with radius 0<Ri<d1/2, and be separated by an angle $\phi$.

If considering what this means at the higher end of the range of h in a typical example infrastructure (as shown in FIGS. 7 and 8 and corresponding to the largest value of (I)), we can suppose the device is at the maximum distance to the first plane (which includes the access points), and h=1.5*d1. Then, according to the geometry of FIG. 8, and supposing that Ro=d1 (as a maximum):

$\phi = 2*\arcsin(0.5*d1/Ro)$ or for $\phi$ smaller than values, $<2*\arcsin(0.5*d1/Ro)$.

Then we get $\phi < 60°$.

Sixthly, in embodiments it may be desirable to have 'x' number of evenly distributed circumferential segments. These circumferential segments may have an overlap spanning angle $\theta$ with neighboring circumferential segments. A generic formula would be $x \geq (360/(\phi-\theta))$.

If considering what this means at the higher end of the range of h in a typical example infrastructure (as shown in FIGS. 7 and 8 and corresponding to the largest value of (I)), we can suppose the device is at the maximum distance to the first plane (which includes the access points), and h=1.5*d1. Then, according to the geometry of FIG. 8, and supposing that Ro=d1 (as a maximum):

$x \geq (360/(60-\theta))$, rounded up to the nearest degree:

For $\theta=0°$: $x \geq 6$
For $1° \leq \theta \leq 8°$: $x \geq 7$
For $9° \leq \theta \leq 16°$: $x \geq 8$, etc.

Figure 9:
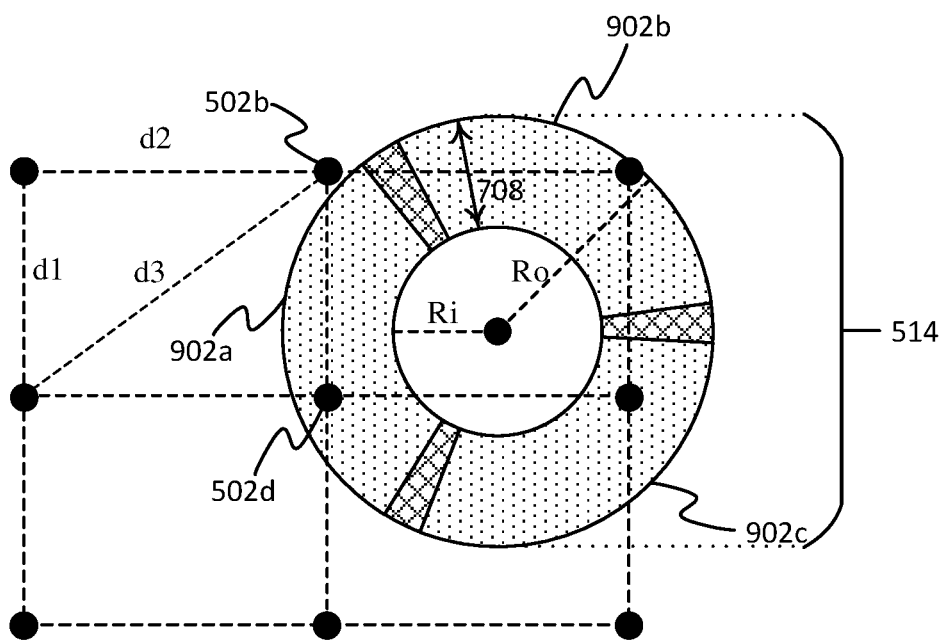
FIG. 9 shows an example of a LiFi system with an access point infrastructure and a LiFi device sensor coverage area with both concentric segments and circumferential segments.

FIG. 9 shows an example system similar to that in FIG. 7. However, the coverage area 514 of the LiFi device has an outermost concentric segment 708 split into three overlapping circumferential segments 902a, 902b, and 902c.

It can be seen how splitting the type A concentric segment into a plurality of type B circumferential segments can help isolate the LiFi data signals received from different LiFi access points when detected by the LiFi device to only one segment. In FIG. 9 it can be seen that if the LiFi client device were to move upwards and to the left there is a good chance segment 902a would cover LiFi access points 502b and its immediate neighbor 502d. This can be mitigated by simply increasing the number of circumferential segments, as shown in later examples of segment arrangement.

Given numerical values or ranges for a typical environment, numerical values and ranges may be determined for the above described criteria.

For example, with typical room ceiling heights of 2.9 m, and typical desk heights between 0.6 m and 0.9 m, the distance h between the plane of the one or more LiFi access points (502) and the plane of e.g. a desk (and thus the LiFi client device 513), can be estimated to be between 2.3 m and 2.0 m. In embodiments, where d1 equals 1.8 m, the value of h may be between 1.8 m and 2.7 m as shown below. Thus using the above stated restrictions to the dimensions of the system regarding d1 and d2, estimated values of d2 can also be worked out. The below provide a range of possible numerical values the various dimensions and angles of the system 500. For example, with h between 1.8 m and 2.7 m, and typically around 2.0 m-2.3 m.

Dimensions d1<d2<1.5*d1 → 1.8 m<d2<2.7 m, typically 2.4 m d1<h<1.5*d1 → 1.8 m<h<2.7 m, typically: 2.0 m-2.3 m
d1=1.8 m
Coverage
Using the above explained criteria for creating the necessary coverage area segments with sufficient coverage:
  Ro large enough >0.5*d3
    → β>42° at h=1.0*d1 (1.8 m), d2=1.5*d1 (2.7 m)
       β>31° at h=1.5*d1 (2.7 m), d2=1.5*d1 (2.7 m)
         Therefore typically: β>37° for h=2.0 m, d2=2.4 m
  Ri large enough >0.3*d1 → α>16.7° at h=1.0*d1
No Interference
Using the above explained criteria for creating the coverage area segments with minimal interference:
  Ro not too large <d1
    → β<33.7° at h=1.5*d1 (2.7 m)
       β<45° at h=1.0*d1 (1.8 m)
         Therefore typically: β<38° at h=2.3 m
  φ not too large
    → φ<60°— overlap at Ro=d1
       φ<43.4°— overlap at Ro=1.5*0.5*d3
This is derived by meeting the case: β=42° (Ro=0.5*d3) at h=1.8 m and applying it at the maximum distance h=2.7 m (=1.5*1.8 m) → Ro=1.5*0.5*d3.
  Ri not too large <0.5*d1
    → α<18.4° at h=1.5*d1
Thus the angle defining the boundary of the inner concentric segment should be equal to or smaller than α. α may also define the innermost boundary of the outermost concentric segment.

In another example embodiment calculated below, the dimension d1 equals 1.2 m, and d2 may range between 1.2 m to 1.8 m. This can be relevant in some cases where an extra LiFi access point is positioned in between two LiFi access points at 2.4 m distance apart. A typical ceiling height is assumed to be about 2.9 meters.

An advantage of a smaller d1 (1.2 m instead of 1.8 m) is that the coverage area of the client device sensor can be smaller. With a smaller coverage area, the client device needs less power for transmission, or may achieve a higher bitrate. The client device itself may also be made smaller, or the sensor made sufficiently small to fit onto small devices. This may apply to sensors on access points or other infrastructure components as well.
Dimensions
d1<d2<1.5*d1 → 1.2 m<d2<1.8 m
1.5*d1<h<2.25*d1 → 1.8 m<h<2.7 m, typically: 2.0-2.3 m
d1=1.2 m
Where the multiplication of d1 to obtain the range of h is found by keeping the same typical ceiling height.
Coverage
  Ro large enough >0.5*d3
    → β>31° at h=1.5*d1, d2=1.5*d1
       β>22° at h=2.25*d1, d2=1.5*d1
         Therefore typically: β>26.6° at h=2.0 m, d2=2.4 m
  Ri large enough >0.3*d1
    → α>11.3° at h=1.5*d1
No Interference
Using the above explained criteria for creating the coverage area segments with minimal interference:
  Ro not too large <d1
    → β<24° at h=2.25*d1
       β<33.7° at h=1.5*d1
         Therefore typically: β<27.6° at h=2.3 m
  φ not too large
    → φ<60°— overlap at Ro=d1
       φ<43.4°— overlap at Ro=1.5*0.5*d3
This is derived by meeting the case: β=42° (Ro=0.5*d3) at h=1.8 m and applying it at the maximum distance h=2.7 m (=1.5*1.8 m) → Ro=1.5*0.5*d3.
  Ri not too large <0.5*d1
    → α<12.5° at h=2.25*d1
Thus the angle defining the boundary of the inner concentric segment should be equal to or smaller than α. α may also define the innermost boundary of the outermost concentric segment.

That is to say, generally for an infrastructure with rectangular grid of d1=1.8 m; and 1.8 m<d2<2.7 m.

Typical values enable a system 500 to:
  Define a range for β by taking typical values for the first and second requirements. Hardening the third requirement, if the second requirement cannot be met. E.g. if Ro<d1 but the LiFi device is centered on a LiFi access point, i.e. no LiFi access point falls within the outermost concentric segment.
  Defining the inner radius of the outer ring. E.g. Ri may in embodiments be thought of as the innermost boundary of the outermost concentric segment.
  First Requirement: The angle β needed for the outer circle with radius Ro shall be large enough (Ro>0.5*d3)
    β>42° (worst case)
    β>37° (typical case)
Second Requirement: The angle β needed for the outer circle with radius Ro should not be too large (Ro<d1).
  This assures that only direct neighbor LiFi access points are present in the outermost concentric segment coverage area, which would otherwise complicate interference handling.
  This is especially relevant for the type A or concentric only segments. If the outer ring is segmented into circumferential segments (type A+type B), the second requirement is less relevant, because then the coverage area of the individual segments will be smaller angularly.
    β<33.7° (worst case)
    β<38° for distance (typical case)
The first and second requirement may be combined.
  The worst case for the first and second requirements combined are conflicting, as is must be true that β>42° and β<33.7°. This can be resolved by either aiming at a typical case, or by adding circumferential segments to the outer ring.
  For the typical case a small range can be defined: 37°<β<38°
Third Requirement: The angle φ for the circumferential (type B) segment should be small enough to prevent multiple LiFi access points appear in the coverage area of such a segment.
  a) If the second requirement is just met:

φ<60° b) If the second requirement is not met, but the first requirement is just met:

φ<43°

The value of b) is derived by meeting the case: β=42° (Ro=0.5*d3) at h=1.8 m, and applying it at the maximum distance h=2.7 m (=1.5*1.8 m), Ro=1.5*0.5*d3.
  The angle α needed for the innermost segment, define by a circle with radius Ri, does not have conflicting worst case requirements. The range can be: 16.7°<α<18.4°.
  In summary, a dongle or other client device may be created with a split coverage area forming segments. The segments should be small enough such that it is possible to select at least one segment that covers only a single LiFi access point. The dongle should be capable of detecting LiFi access points (and e.g. LiFi modems), and select one or multiple segments to provide an interference free communication link to a single LiFi modem (e.g. via one or more segments or LiFi access points).

Figure 10A:
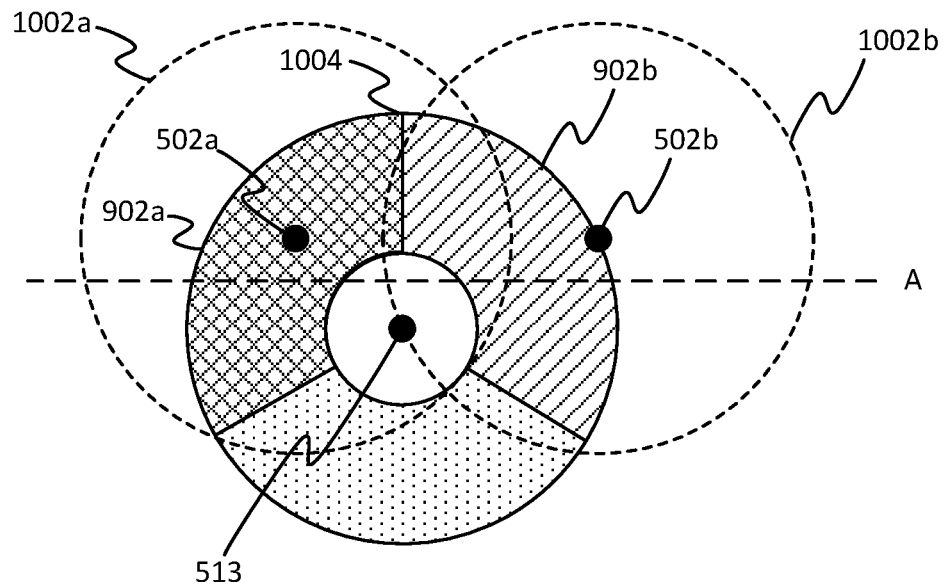
FIG. 10A shows an example LiFi system comprising two LiFi access points with respective coverage areas, a client device with a sensor coverage area comprising a first and second segment, and a boundary between the first segment and the second segment, the LiFi access point coverage areas both overlapping the boundary.

FIG. 10A shows two LiFi access points 502a, 502b with respective coverage areas 1002a and 1002b. It can be seen that at the boundary 1004, between a first segment 902a and a second segment 902b, the LiFi access point coverage areas 1002a and 1002b overlap the boundary. As a result both segments 902a and 902b detect a part of the LiFi data signal from both of the LiFi access points. This cross detection of LiFi access points can cause interference between the two LiFi data signals received at either segment of the LiFi client device. One way to mitigate this interference is shown in FIG. 10B.

Figure 10B:
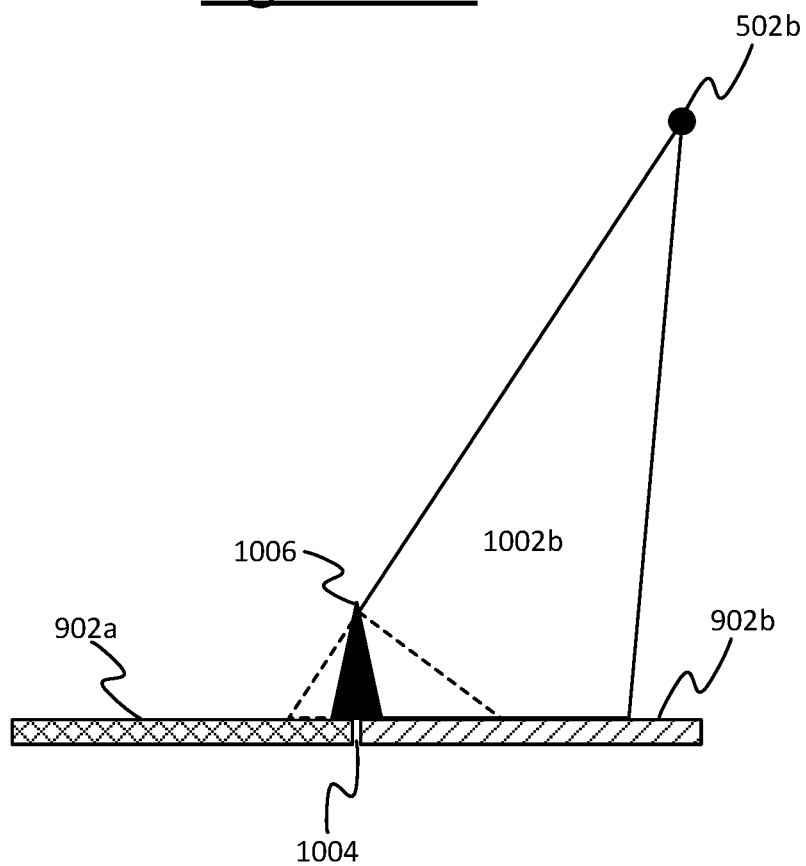
FIG. 10B shows the example LiFi system of FIG. 10A comprising a separating wall along the boundary.

FIG. 10B shows an embodiment where a low separating wall is placed along the boundary 1004. The purpose of this boundary 1004 is to perform a kind of collimation of the received LiFi data signals from the two different LiFi access points. For example, a wall between the two segments 902a and 902b may shadow off, or of block out the LiFi signal of the right hand access point 502b such that is does not to reach the left hand segment 902a. If the wall is made of a reflective material the blocked light may reflect off of the wall. If correctly angled it may even reflect downwards on to the right hand side segment 902b. The right hand segment 902b would be where most of the right hand access point's 502b LiFi signal falls incident anyway, and thus this re-direction may serve to conserve energy by not wasting this reflected portion of the LiFi data signal. Such collimators may increase the directional specificity, as well as the effectiveness, of a single segment of such a segmented sensor.

FIG. 10B shows such a collimating structure 1006 from the perspective of the cut line A in FIG. 10A. The structure shown is a wall 1006 placed on the segment border 1004 which in an embodiment blocks off the LiFi data signal light from the neighboring segment (reducing interference in the neighboring segment). In a further embodiment, the LiFi light is reflected back into the related sensor segment and increases the efficiency there. The angle and reflectivity of the wall can be designed to achieve the best optical performance. An example implementation may comprise a wall at a 10 degree angle to the orthogonal direction of the LiFi data signal light. It should be understood that this is only an example, and that other angles may be chosen to optimize the reflection angle of the LiFi data signal for optimum reception by the segment it is reflected into. It should also be understood that the degree of reflectiveness may also be chosen according to design of the sensor and system being used. The reflective material enabling the scavenging of the LiFi light which may otherwise be lost. Also, in this way only light within a certain incoming angle would be re-directed to hit the surface of a sensor segment.

As mentioned above, another way of reducing cross sector interference (e.g. other than the above described collimating wall), may be by having areas between segments which do not contribute to the signal received at any segment (e.g. which are blanked, blocked or screened off somehow). Using the same scenario as in FIG. 10A, the light of the right hand side access point 502b my fall into such a passive area around the boundary 1004, and thus not cause any interference in the left hand segment 902a. This may be provided by the addition of an intermediate segment, as described above, to produce a gap between the left and right segments. As a further consequence, in the scenario of FIG. 10A, less of the light from the left hand access point 502a would cause interference in the right hand segment 902b.

In embodiments, the LiFi client device may contain a number of circumferential segments (in addition to at least two concentric segments), each capable of providing different communication exchanges. That is, each LiFi segment may be a transceiver, and may contain a LiFi transmitter and a LiFi receiver having the same or similar coverage.

In embodiments, the LiFi client device may contain a large number of circumferential segments (in addition to at least two concentric segments). In this case, interference can be handled in many situations as the coverage area of each segment is necessarily small (e.g. to fit into 360 degrees). That is, a large number of circumferential segments are used to cover the 360 degrees, so that each segment is a small fraction of the 360 degrees. Thus making it easier to select a single LiFi segment which only covers a single LiFi access point.

In embodiments, the LiFi client device may be capable of combining two or more segments. E.g. in the case where a LiFi access point is detected at the border between two segments. For example, given a LiFi device with six circumferential segments as in FIG. 11, any rotation of the device would not lead to an interference issue due to LiFi signals being detected in the same segment from different LiFi access points. I.e. there is always a segment with a coverage area in which only a single LiFi access point occurs. In the situation where an access point occurs at a boundary between two segments, the LiFi client device may combine the two segments as though one large segment for receiving more of the LiFi data signal transmitted by that access point.

It can be seen to be advantageous to have a single central concentric segment of the sensor which has no circumferential segments. For example, should the sensor configuration of only type B circumferential segments in FIG. 6 be positioned directly over a LiFi access point, the device would have to use one or a combination of the type B segments to receive the LiFi data signal. Further, if the device were to move around the area immediately surrounding the LiFi access point, the LiFi access point would continually be moving into a different segment of the coverage area as it moved between the different type B segments. Of course, it would be possible to select all the circumferential type B segments to avoid these many changes, but this may result in using more power as all segments would have to be used at once. Thus in the above described embodiments, where the device sensor comprises at least two concentric type A segments, and a plurality of circumferential type B segments, a good balance is achieved between the sizes and positioning of the individual segments such that they may be configured to be used together or separately to suit many different LiFi system configurations.

In embodiments, the different segments may be used to trigger pre-establishing processes for handing over to a next LiFi access point. In FIG. 11, if the LiFi device 513 moves towards the upper right hand LiFi access point 502b as indicated with the arrow 1102, one of the circumferential segments can take over the communication as indicated with the left-most segment 1104. The upper right hand access point 502b comes into the coverage area of the right-most segment 1106. The device may as a result of the upper right hand access point 502b entering the segment 1106, begin to prepare for handover to this access point 502b by pre-establishing a communication link with this access point 502b via the right-most segment. If the LiFi device moves further and loses the communication link with the original LiFi access point 502a, it can quickly change to perform further communication via the new right hand LiFi access point 502b.

In embodiments, the LiFi device may contain a plurality of concentric and circumferential segments, each covering a different portion of the coverage area of the LiFi device sensor for communication purposes, whereby all the segments have some overlap. In embodiments, each segment is provided by a LiFi transceiver comprising a LiFi transmitter and a LiFi receiver having the same or similar coverage. The overlap of the segments allows the LiFi device to choose a single transceiver or combination of them for providing a communication link with the LiFi access point. The selection of a combination for example may be in response to the LiFi access point being near the border of two segment coverage areas. FIG. 11 shows a LiFi device sensor coverage area comprising six circumferential (or type B) segments and two concentric (or type A) segments (the outermost concentric segment comprising the circumferential segments), all segments may additionally have some overlap between their coverage areas (not shown). In the situation as described above, the LiFi device may choose to communicate via either a single segment (concentric or circumferential) or a combination thereof.

It will be appreciated that the above embodiments have been described by way of example only.

It will be appreciated that while embodiments have been exemplified in terms of particular ranges of h and d1, it will be appreciated that it is the relative ratio of these dimensions that is more relevant and the absolute values are not limiting.

More generally, according to one aspect disclosed herein, there is provided a client device for use in an optical wireless communications network, the client device comprising: a transceiver configured to receive data via an optical wireless connection (and optionally also transmit data via an electromagnetic wireless connection) The transceiver comprises an upward facing sensor configured to detect an optical wireless transmission, the sensor arranged to have a coverage area with at least two concentric segments. A portion of the sensor configured to provide an outermost segment of the at least two concentric segments is dimensioned such that, in embodiments, any one or more of the following may apply.

a) The angle at the sensor between an outer edge of the outermost segment and the normal to the plane of the sensor, with a plane of the coverage area perpendicular to said normal and at a distance from the sensor, may be larger than 31 degrees, optionally larger than 42; or the angle at the sensor between an outer edge of the outermost segment and the normal to the plane of the sensor, with a plane of the coverage area perpendicular to said normal and at a distance from the sensor, may be larger than 22 degrees, optionally larger than 31 degrees.

b) The portion of the sensor configured to provide an outermost segment of the at least two concentric segments may be dimensioned such that:
the angle at the sensor between an outer edge of the outermost segment and the normal to the plane of the sensor, with a plane of the coverage area perpendicular to said normal and at a distance from the sensor, is smaller than 45 degrees, optionally smaller than 33.7 degrees; or
the angle at the sensor between an outer edge of the outermost segment and the normal to the plane of the sensor, with a plane of the coverage area perpendicular to said normal and at a distance from the sensor, is smaller than 33.7 degrees, optionally smaller than 24 degrees.

c) The portion of the sensor configured to provide the outermost segment of the at least two concentric segments may be dimensioned such that the outermost segment of the at least two concentrically arranged segments is split into further segments circumferentially, each bounded by the maximum radius of the outermost concentric segment, the maximum radius of the innermost concentric segment, and two radial lines extending from the centre of the coverage area to the maximum radius of the outermost segment, wherein: the two radial lines are separated by an angle (y) less than 43.4 degrees; optionally wherein the two radial lines are separated by an angle (y) less than 43 degrees.

d) The portion of the sensor configured to provide the outermost segment of the at least two concentric segments may be dimensioned such that the outermost segment of the at least two concentrically arranged segments is split into further segments circumferentially, each bounded by the maximum radius of the outermost concentric segment, the maximum radius of the innermost concentric segment, and two radial lines extending from the centre of the coverage area to the maximum radius of the outermost segment separated by an angle (y) less than 60 degrees.

e) The portion of the sensor configured to provide the outermost segment may be dimensioned such that the circumferential segments overlap with neighbouring circumferential segments by an angle theta.

f) The portion of the sensor configured to provide an innermost segment of the at least two concentric segments may be dimensioned such that:
the angle at the sensor between an outer edge of the innermost segment and the normal to the plane of the sensor, with a plane of the coverage area perpendicular to said normal and at a distance from the sensor, is between 16.7 degrees and 18.4 degrees; or
the angle at the sensor between an outer edge of the innermost segment and the normal to the plane of the sensor, with a plane of the coverage area perpendicular to said normal and at a distance from the sensor, is between 11.3 degrees and 12.5 degrees.

According to another aspect provided herein, there is provided a system configured to provide an optical wireless communication network comprising: a plurality of infrastructure nodes arranged on intersections of a grid structure in a first plane and configured to provide access points of the network, the grid structure being comprised of quadrilaterals (preferably equiangular quadrilaterals, i.e. squares or oblong rectangles) each with an x-axis dimension equal to d1, a y-axis dimension equal to d2, and a diagonal dimension equal to d3, where d2 is greater than or equal to d1; and at least one client device, the client device comprising: an upward facing optical wireless sensor, the sensor arranged to have a coverage area with at least two concentric segments; and. In embodiments any one or more of the following may apply.

g) An outermost segment of the at least two concentric segments may be dimensioned such that, when the client device is positioned in a second plane parallel to the first plane and at a distance from the first plane, said segment's coverage area has a maximum radius, at said first plane greater than 0.5*d3.

h) The sensor may be arranged such that the outmost segment of the at least two concentric segments is dimensioned such that, when the client device is positioned in a second plane parallel to the first plane and at a distance from the first plane, said segment's coverage area has a maximum radius, Ro, at said first plane of a value less than d1.

i) The sensor may be arranged such that an innermost segment of the at least two concentrically arranged segments is dimensioned such that, when the client device is positioned in a second plane parallel to the first plane and at a distance from the first plane, said segment's coverage area has a maximum radius, at said first plane of a value greater than 0.3*d1.

j) The sensor may be arranged such that the innermost segment of the at least two concentrically arranged segments is dimensioned such that, when the client device is positioned in a second plane parallel to the first plane and at a distance from the first plane, said segment's coverage area has a maximum radius, at said first plane of a value less than half the value of d1.

k) The sensor may be arranged such that the outermost segment of the at least two concentrically arranged segments is split into further segments circumferentially, each bounded by the maximum radius of the outermost concentric segment, Ro, the maximum radium of the innermost concentric segment, Ri, and two radial lines extending from the centre of the coverage area to the maximum radius of the outermost segment, and separated by an angle where the chord formed between the points of intersection of the radial lines with the maximum radius of the outermost segment has a length less than d1.

Although embodiments above have been described in terms of a sensor detecting from the cells signals on a downlink, any of the described arrangements may equally be used in relation to a segmented transmitter of the user device arranged to transmit to the cells on an uplink. Therefore in any statement herein, the recitation of a sensor may be replaced more generally with the recitation of a transducer which could comprise a downlink sensor, uplink transmitter or both. The use of spatial division to save power, reduce interference, and/or improve the link budget can be achieved equally on the uplink as the downlink.

In embodiments, the client device may have both uplink and downlink optical capability. The transmitter and the receiver of the client device may be physically separated each having their own lens. The uplink and downlink may use slightly different wave-lengths (resulting in similar refraction by the optics) and/or may use the same wavelength when the uplink and downlink are not active at the same time. In embodiments the uplink and downlink may have the same or similar total coverage area.

For instance, a LiFi-device may have a single LiFi-device-modem for both transmitting and receiving data. It may further have m LiFi-device-transmitters (LiFi-device-Tx) and n LiFi-device-receivers (LiFi-device-Rx), connected via multiplexers to the LiFi-device-modem. In accordance with embodiments disclosed herein, the n LiFi-device-Rxs are optically arranged in segments, each with a small coverage area on the first planar area to mitigate the interference of multiple LiFi-AP downlink communications when the device is present in the overlapping area of multiple LiFi-APs. To solve, or at least mitigate, the interference of multiple LiFi-AP downlink communications, the segments can be arranged such that at least one of them can be selected having a coverage area on the first planar area in which only a single LiFi-AP occurs. The m LiFi-device-Txs are optically arranged in segments, each with a small coverage area on the first planar area to mitigate the interference of multiple LiFi-device uplink communications when a LiFi-AP is present in the overlapping area of multiple LiFi-devices. This also enables a reduction in the power for the uplink. To solve, or at least mitigate, the interference of multiple LiFi-device uplink communications, the segments can be arranged such that at least one of them can be selected having a coverage area on the first planar area in which only a single LiFi-AP occurs." The values n and m can be different. To have similar behavior for up and down-link, n and m may be equal whereby each of the n==m segments may have the same or similar coverage area.

In alternative embodiments the client device may have only uplink or only downlink optical capability. E.g. in some cases the client device may have only optical downlink capability, with either no uplink or an RF uplink.

Throughout the description and claims reference is made to transducers, in accordance with the claimed invention these transducers are arranged to be used within an optical wireless communication network. In line therewith, transducers as presented herein may correspond to (segmented) sensors, such as photodiodes and/or phototransistors for receiving optical wireless communication signals. In order to accommodate for the indicated coverage areas for reception, such sensors may be fitted with optics in the form of e.g. lenses. As envisaged by the claimed invention such sensors may be arranged to receive visible light, or alternatively infrared light.

As indicate hereinabove, the transducers may alternatively correspond to transmitters for use in an optical communication network, such as Light Emitting Diodes (LEDs) or Laser diodes. Similar to the sensors described hereinabove such transmitters may also be fitted with optics in the form of e.g. lenses that can be selected to accommodate for the required coverage areas for transmission. As will be appreciated by those skilled in the art of optical wireless network design, preferably devices in accordance with the invention comprise both sensors as well as transmitters allowing for bi-directional communication.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A client device for use in an optical wireless communication network, the network comprising a plurality of infrastructure nodes arranged on intersections of a grid structure in a first plane and configured to provide access points of the network, the grid structure comprising quadrilaterals each with an x-axis dimension equal to d1, a y-axis dimension equal to d2, and a diagonal dimension equal to d3, where d2 is greater than or equal to d1, the client device comprising:

an upward facing optical transducer configured to detect or transmit an optical wireless transmission from or to the network respectively, the transducer arranged to have a coverage area with at least two concentric segments; and a portion of the transducer configured to provide an outermost segment of the at least two concentric segments dimensioned such that:

when the client device is positioned in a second plane parallel to the first plane and at a distance from the first plane, said coverage area has a radius at said first plane greater than 0.5*d3.

2. The client device according to claim 1, wherein the portion of the transducer configured to provide an outermost segment of the at least two concentric segments is dimensioned such that:

the angle at the transducer between an outer edge of the outermost segment and the normal to the plane of the transducer, with a respective outer edge of the coverage area of a plane perpendicular to said normal and at a distance from the transducer, is larger than 31 degrees; or the angle at the transducer between an outer edge of the outermost segment and the normal to the plane of the transducer, with a respective outer edge of the coverage area of a plane perpendicular to said normal and at a distance from the transducer, is larger than 22 degrees.

3. The client device according to claim 1, wherein the portion of the transducer configured to provide an outermost segment of the at least two concentric segments is dimensioned such that:

the angle at the transducer between an outer edge of the outermost segment and the normal to the plane of the transducer, with a respective outer edge of the coverage area of a plane perpendicular to said normal and at a distance from the transducer, is smaller than 45 degrees; or the angle at the transducer between an outer edge of the outermost segment and the normal to the plane of the transducer, with a respective outer edge of the coverage area of a plane perpendicular to said normal and at a distance from the transducer, is smaller than 33.7 degrees.

4. The client device according to claim 1, wherein the portion of the transducer configured to provide the outermost segment of the at least two concentric segments is dimensioned such that the outermost segment of the at least two concentrically arranged segments is split into further segments circumferentially, each bounded by a radius of the an outermost concentric segment, a radius of an innermost concentric segment, and two radial lines extending from the centre of the coverage area to the radius of the outermost segment, wherein: the two radial lines are separated by an angle less than 43.4 degrees.

5. The client device according to claim 3, wherein the portion of the transducer configured to provide the outermost segment of the at least two concentric segments is dimensioned such that the outermost segment of the at least two concentrically arranged segments is split into further segments circumferentially, each bounded by a radius of an outermost concentric segment, a radius of an innermost concentric segment, and two radial lines extending from the centre of the coverage area to the radius of the outermost segment separated by an angle less than 60 degrees.

6. The client device according to claim 1, wherein the portion of the transducer configured to provide the outermost segment is dimensioned such that the circumferential segments overlap with neighbouring circumferential segments by an angle.

7. The client device according to claim 1, wherein the portion of the transducer configured to provide an innermost segment of the at least two concentric segments is dimensioned such that:

the angle at the transducer between an outer edge of the innermost segment and the normal to the plane of the transducer, with a respective outer edge of the coverage area of a plane perpendicular to said normal and at a distance from the transducer, is between 16.7 degrees and 18.4 degrees; or the angle at the transducer between an outer edge of the innermost segment and the normal to the plane of the transducer, with a respective outer edge of the coverage area of a plane perpendicular to said normal and at a distance from the transducer, is between 11.3 degrees and 12.5 degrees.

8. A system configured to provide an optical wireless communication network comprising:

a plurality of infrastructure nodes arranged on intersections of a grid structure in a first plane and configured to provide access points of the network, the grid structure being comprised of quadrilaterals each with an x-axis dimension equal to d1, a y-axis dimension equal to d2, and a diagonal dimension equal to d3, where d2 is greater than or equal to d1; and at least one client device, the client device comprising:
an upward facing optical wireless transducer for receiving or transmitting optical wireless signals from or to the network respectively, the transducer arranged to have a coverage area with at least two concentric segments;

wherein an outermost segment of the at least two concentric segments is dimensioned such that, when the client device is positioned in a second plane parallel to the first plane and at a distance from the first plane, said coverage area has a radius, Ro, at said first plane greater than 0.5*d3.

9. The system according to claim 8, wherein the transducer is arranged such that the outermost segment of the at least two concentric segments is dimensioned such that, when the client device is positioned in a second plane parallel to the first plane and at a distance from the first plane, said segment's coverage area has a radius, Ro, at said first plane of a value less than d1.

10. The system according to claim 8, wherein the transducer is arranged such that an innermost segment of the at least two concentrically arranged segments is dimensioned such that, when the client device is positioned in a second plane parallel to the first plane and at a distance from the first plane, said segment's coverage area has a radius, Ri, at said first plane of a value greater than 0.3*d1.

11. The system according to claim 8, wherein the transducer is arranged such that the innermost segment of the at least two concentrically arranged segments is dimensioned such that, when the client device is positioned in a second plane parallel to the first plane and at a distance from the first plane, said segment's coverage area has a radius, Ri, at said first plane of a value less than half the value of d1.

12. The system according to claim 8, wherein the transducer is arranged such that the outermost segment of the at least two concentrically arranged segments is split into further segments circumferentially, each bounded by the radius of the outermost concentric segment, Ro, the radius of the innermost concentric segment, Ri, and two radial lines extending from the centre of the coverage area to the radius of the outermost segment, and separated by an angle where the chord formed between the points of intersection of the radial lines with the radius of the outermost segment has a length less than d1.

13. The system according to claim 12, wherein each of the circumferential segments overlap with their respective neighbouring circumferential segments, but do not overlap with any inner concentric segment.

14. The system according to claim 12, wherein each of the circumferential segments is separated from neighbouring circumferential segments by a wall perpendicular to the surface of the transducer.

15. The system according to claim 14, wherein the wall comprises a reflective material.

16. An infrastructure node for use with a an optical wireless communication network comprising a plurality of infrastructure nodes arranged on intersections of a grid structure in a first plane and configured to provide access points of the network and a client device in a second plane, the grid structure comprising quadrilaterals each with an x-axis dimension equal to d1, a y-axis dimension equal to d2, and a diagonal dimension equal to d3, where d2 is greater than or equal to d1, the infrastructure node device comprising:
 a downward facing optical wireless transducer, the transducer being arranged to have a coverage area with at least two concentric segments; and
 an outermost segment of the at least two concentrically arranged segments dimensioned such that, when the client device is positioned in a second plane parallel to the first plane and at a distance, said coverage area has a radius, Ro, at said second plane greater than 0.5*d3.

* * * * *